United States Patent
Pellenc

(10) Patent No.: US 9,744,685 B2
(45) Date of Patent: Aug. 29, 2017

(54) STATIC COOLING ELECTRIC CHAIN SAW AND METHOD USED TO ACHIEVE SAID COOLING

(75) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 1451 days.

(21) Appl. No.: 12/527,656

(22) PCT Filed: Feb. 25, 2008

(86) PCT No.: PCT/FR2008/000246
§ 371 (c)(1),
(2), (4) Date: Dec. 7, 2009

(87) PCT Pub. No.: WO2008/122718
PCT Pub. Date: Oct. 16, 2008

(65) Prior Publication Data
US 2010/0083513 A1   Apr. 8, 2010

(30) Foreign Application Priority Data
Feb. 26, 2007   (FR) ...................................... 07 01358

(51) Int. Cl.
*B27B 17/08*   (2006.01)
*H02K 9/22*   (2006.01)
*H02K 5/18*   (2006.01)
*H02K 7/14*   (2006.01)

(52) U.S. Cl.
CPC .............. *B27B 17/08* (2013.01); *H02K 9/22* (2013.01); *H02K 5/18* (2013.01); *H02K 7/145* (2013.01); *Y10T 83/707* (2015.04)

(58) Field of Classification Search
CPC . B27B 17/08; H02K 9/22; H02K 5/18; H02K 7/145; Y10T 83/04; Y10T 83/707; Y10T 83/7076; Y10T 83/7145
USPC .............. 83/13, 788, 789, 801; 30/381–387; 310/64, 68 D
See application file for complete search history.

(56) References Cited

U.S. PATENT DOCUMENTS

| | | | | |
|---|---|---|---|---|
| 3,665,712 | A * | 5/1972 | Tenney | 60/314 |
| 4,837,934 | A * | 6/1989 | Krohn | 30/387 |
| 4,964,217 | A * | 10/1990 | Siede et al. | 30/383 |
| 5,029,393 | A * | 7/1991 | Nagashima et al. | 30/383 |
| 5,212,886 | A * | 5/1993 | Tasaki | 30/381 |
| 6,989,616 | B2 * | 1/2006 | Okubo et al. | 310/64 |
| 7,109,613 | B2 * | 9/2006 | Lui | 310/64 |
| 2003/0088987 | A1 * | 5/2003 | Jong | 30/381 |
| 2004/0089260 | A1 * | 5/2004 | Nozaki et al. | 123/193.4 |

(Continued)

FOREIGN PATENT DOCUMENTS

| | | |
|---|---|---|
| EP | 0024268 | 2/1981 |
| EP | 0192469 | 8/1986 |

*Primary Examiner* — Phong Nguyen
(74) *Attorney, Agent, or Firm* — Egbert Law Offices, PLLC

(57) ABSTRACT

Electric chain saw with static cooling features a cutting chain fitted so as to turn around a drive sprocket and a guide bar of oblong shape, and an electric motor effecting the drive of this chain, through the intermediary of the sprocket. The electric drive motor drive of the cutting chain is a brushless direct current motor enclosed in a housing formed by at least two components and made of a light metallic alloy, with one surface of the housing being in contact with the drive motor drive, to provide static cooling.

15 Claims, 4 Drawing Sheets

(56) References Cited

U.S. PATENT DOCUMENTS

2005/0236917 A1    10/2005  Lui
2008/0073986 A1*    3/2008  Lee .................................. 310/71

* cited by examiner

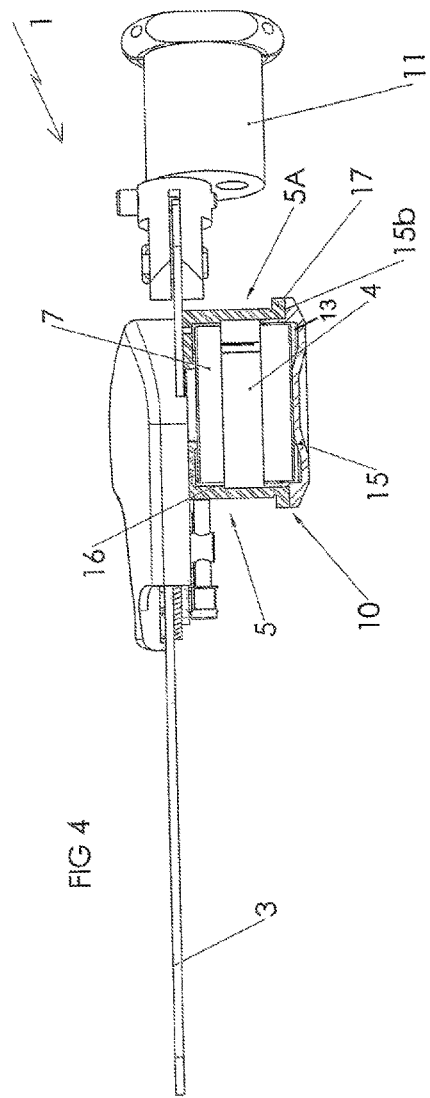

STATIC COOLING ELECTRIC CHAIN SAW AND METHOD USED TO ACHIEVE SAID COOLING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a static cooling electric chain saw. It also deals with the method implemented to achieve this static cooling.

More precisely, the invention applies to chain saws in which the drive of the cutting chain is performed by an electric motor.

2. Description of Related Art Including Information Disclosed Under 37 CFR 1.97 and 37 CFR 1.98.

The drive of the cutting chain of the known electric chain saw is performed by means of low performance electric motors, so that about 50% of the power delivered by the motor is to be dissipated, to avoid the effect of overheating, because of the significant thermal losses generated.

The devices used to carry out the dissipation of the heat generated by the electric motor employ turbines or ventilators creating air circulation around the motor. The addition of a turbine or a ventilator to the motor of the saw has the considerable inconvenience of complicating the manufacture of the tool, increasing its production cost, and causing additional energy consumption, and adding to what is necessary to driving the cutting chain.

Furthermore, to be efficient, these cooling systems require openings to be made in the motor housing to facilitate the circulation of cooling air around the motor. The main inconvenience of these openings is to disrupt the sealing of the motor and to allow the penetration of water, dust and sawdust resulting from wood cutting wood operations.

In the document US-2005/0236917, an electric hand tool is described which includes an electric motor enclosed in a casing which is itself embedded in the tool housing, and a cooling system constituted by a thermal conducting device connecting said casing to said housing, so as to allow the heat produced by the motor to dissipate. This cooling device complicates the manufacture of the tool and does not allow for efficient heat dissipation for high-powered electric motors like those, which generally equip electric chain saws.

The particular aim of the invention is to remedy the aforementioned inconveniences of electric chain saws and their cooling system.

BRIEF SUMMARY OF THE INVENTION

One recalls that tools that are commonly called chain saws are well known and are commonly used to cut various materials (wood, concrete, bricks, tiles, etc.) They include a cutting device constituted by an endless cutting chain fitted so as to turn around a drive sprocket and a guide bar generally of an oblong shape and equipped with a peripheral guide rail and a power source which, in the case of electric saws is constituted by an electric motor effecting the drive of this chain, through the intermediary of said sprocket.

According to a first characteristic arrangement of the invention, the electric motor driving the cutting chain is constituted by a brushless direct current motor, commonly so called, enclosed in a housing constituted by at least two parts and made of a light metal alloy, with one surface of which it is in contact so as to ensure the static cooling of said motor.

According to another characteristic arrangement, the chain saw features an electronic control card of the motor driving the cutting chain and this electronic card is also encased in said cooling housing a surface of which is in direct contact with the commutation components of this electronic control card.

Preferably, the cooling housing is made of an aluminum alloy or a magnesium alloy.

According to a preferred mode of execution, at least one of the housing parts features one or several cooling fins.

According to another mode of execution, one of the faces of one of the components of the cooling housing is fitted so as to receive and support the removable guide bar of the tool and with which the latter is in contact so that said guide bar thereby contributes to the dissipation of the heat generated by the motor.

According to another mode of execution, the handle of the chain saw attached to the cooling housing of the chain saw constitutes an exchanging device participating in the cooling of the motor driving the cutting chain of said saw.

Preferably, the handle is an integrated part of the housing.

According to another mode of execution, the cooling handle is fastened on the two components forming the housing.

According to another mode of execution, applicable to pole-mounted chain saws, the pole also constitutes an exchanging device participating in the cooling of the motor driving the cutting chain of said saws.

Advantageously, each of the components of the cooling housing, the guide bar, the handle and the pole cooperate with the motor and with the electronic control card of said motor to carry the heat generated by the latter toward the outside.

According to an interesting mode of execution, the stator of the motor is in direct contact with one of the components of the cooling housing.

Advantageously, the leading out wires of the winding of the motor stator are wrapped, without contact, by one and the other components of the housing, respectively.

Interestingly, the respective seats of the motor and the electronic control card in the housings are separated by cooling partitions made in the two components of the cooling housing. Advantageously, the assembly of the two housing components is waterproof and dustproof.

The static cooling electric chain saw according to the invention offers several interesting advantages.

Use of a brushless motor with high performance, above 68%, generating low thermal losses, that is to say, little energy to dissipate, allows the implementation of an efficient device for static cooling by convection or radiation. This device also allows evacuating the heat emitted by the power commutation components of the electronic control card.

The high efficiency of the motor and the static cooling device make it possible to have a space-saving and lightweight tool body which does not interfere with the utilization of the tool.

The cooling device is economical and of a simple design, requiring no addition of supplemental parts to the motor as such.

It requires no provision of any opening in the housing so that it will not be contaminated by humidity, dust or sawdust.

Motorized electric chain saws equipped with the cooling system according to the invention constitute professional tools that are capable of operating over long periods of time.

According to the method of the invention, the drive of said chain is achieved by means of a brushless direct current motor, and this motor is enclosed in a housing constituted by at least two components and produced of a light metallic alloy, one surface at least of this housing being put into contact with said motor, so as to provide the static cooling of the latter.

According to a preferred mode of implementation applied to a chain saw featuring an electronic card for controlling the motor, the method is also remarkable in that the commutation components of the card are put into contact with at least one component of the cooling housing.

BRIEF DESCRIPTION OF THE SEVERAL VIEWS OF THE DRAWINGS

The aforementioned aims, characteristics and advantages, and still more, will become clearer from the description below and the attached drawings.

FIG. 4 is also a partial perspective and sectional view analogous to FIG. 2, showing a chain saw according to a third mode of implementation of the invention.

Figure 1:
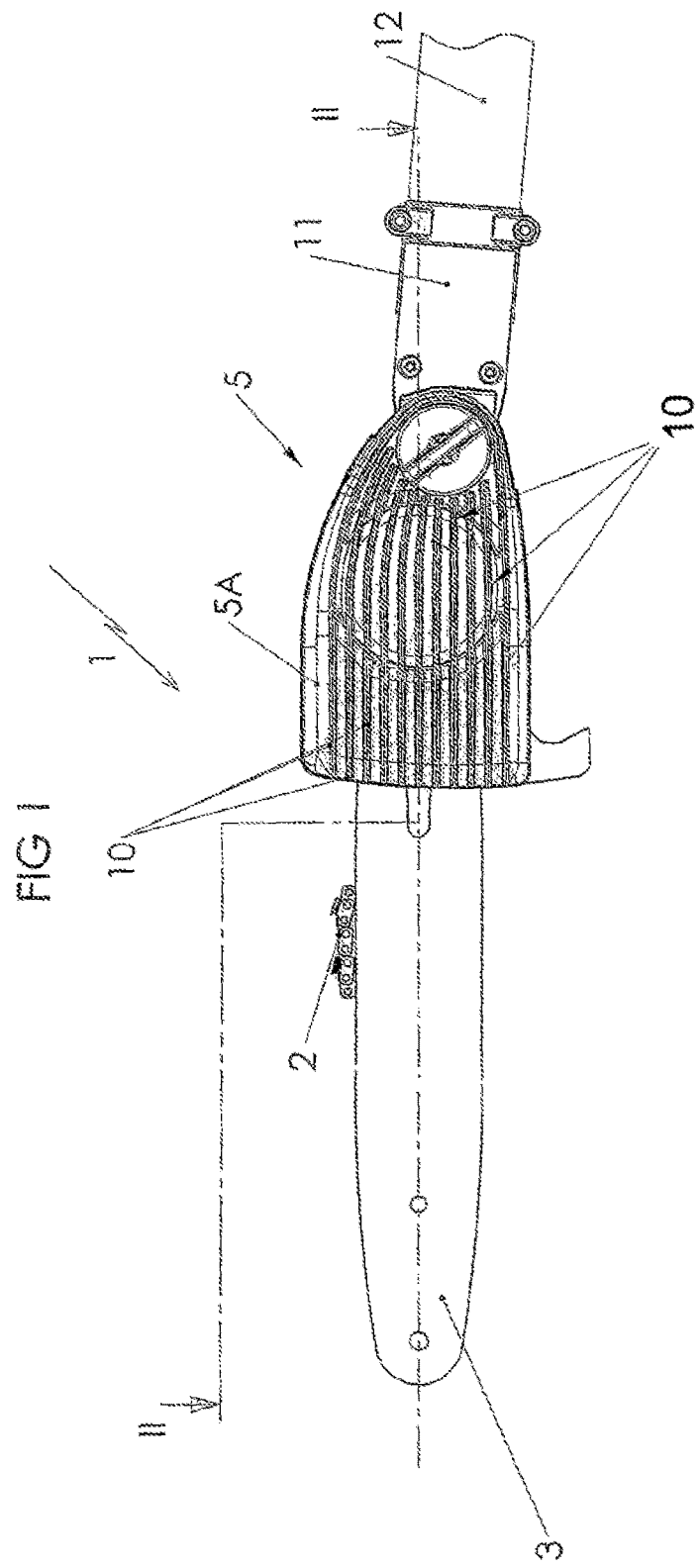
FIG. 1 is a front elevational view of a production example of a chain saw on which the application can be implemented.
Figure 2:
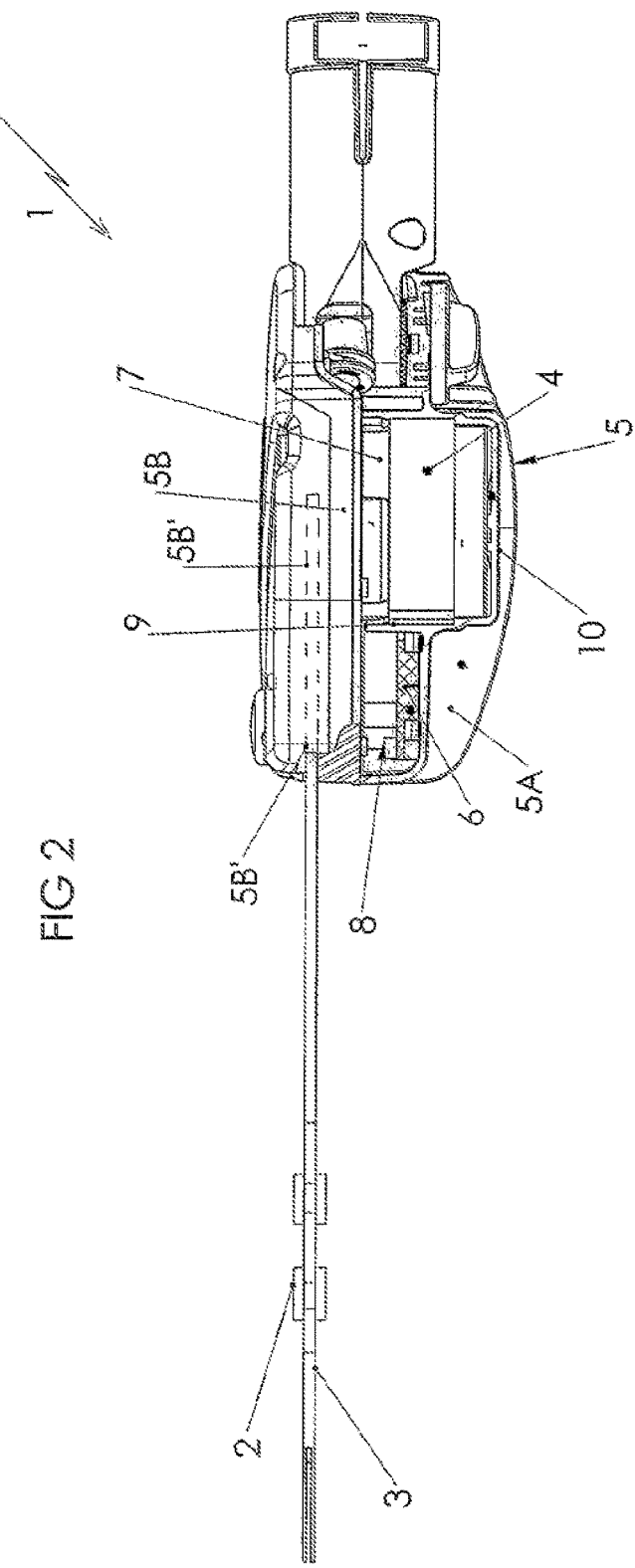
FIG. 2 is an exploded perspective view and partial sectional view along line II-II of FIG. 1.

Reference is made to said drawings to describe interesting, although by no means limiting examples of production of the chain saw and its cooling method according to the invention.

The elements of the chain saw, which fulfill the same functions in the three illustrated and described modes of implementation, are designated by the same references on the drawings and the following presentation.

DETAILED DESCRIPTION OF THE INVENTION

Chain saws 1, commonly used to cut various materials (wood, concrete, bricks, tiles, . . . ) include a cutting device constituted by an endless cutting chain 2 fitted so as to turn around a drive sprocket and a guide bar 3 generally of an oblong shape and equipped with a peripheral guide rail and a power source which, in this case, is constituted by an electric motor 4.

According to the invention, this electric motor 4 is constituted by a brushless direct current motor preferably of a rating above 500 W and of high efficiency, above 68%, for example, of a rating of 1 kW and an efficiency rating between 85 and 90%, its operation generating only small quantities of heat energy to be dissipated.

This brushless electric motor is encased in a housing 5 constituted by at least two components 5A, 5B and produced of light metallic alloy, being a good heat conductor, preferably of an aluminum alloy or of a magnesium alloy.

The motor 4 is positioned in the housing 5 so as to be in direct contact with at last one surface of at least one (5A) of the components 5A, 5B of the housing 5, thereby providing the static cooling of said motor, by convection and/or radiation.

In certain preferred modes of production, the chain saw may feature an electronic card 6 for controlling the motor 4.

According to a mode of execution, the electronic control card of motor 4 driving the cutting chain 2 of the saw is likewise encased in the cooling housing 5, so that its power commutation components 6a are in contact with at least one surface of at least one of the components 5A, 5B of the housing, thereby providing the static cooling of said commutation components, by convection and/or radiation.

The motor 4 is installed in a seat 7 made in the housing 5, whereas the electronic card 6 is positioned in a second recess 8 made in proximity of the first and separated from it by a partition 9, forming a cooling wall.

At least one of the components 5A, 5B of the housing 5, preferably component 5A as shown on the drawings, is equipped with one or several cooling fins 10 extending to the exterior, in a substantially parallel manner and over the entire length of the housing 5, as shown particularly in FIG. 1.

The stator 4a of the motor 4 is placed directly in contact with one (5A) of the components 5A, 5B of the housing.

For example, the motor 4 is mounted in a blind cylinder 13, which presents the internal face of the component 5A of the housing 5, and the bottom of this blind cylinder 13 is in contact with the cooling fins 10. Preferably, the stator 4a of the motor 4 is directly in contact with the sidewall of this cylinder 13.

The two components 5A, 5B are assembled in a tight manner by means of any appropriate link system (screw, bolts, etc.)

According to another characteristic arrangement, one of the faces (5B') of one of the constitutive components 5A, 5B of the cooling housing 5, is fitted to receive and support the removable metallic guide bar or the chain saw. In this case, the guide bar is in contact with a surface 5B' of the housing, so that said guide bar constitutes an additional means of heat exchange and contributes also to the dissipation of the heat generated by the motor 4 driving the cutting chain 2. It is produced in a light metallic alloy, which is a good heat conductor.

According to another mode of execution, the handle of the chain saw attached to the cooling housing 5 of the saw constitutes also an additional heat exchanger and participates in the dissipation of the heat generated by the motor 4 driving the cutting chain of the chain saw.

This handle may be an integral part of the housing 5. It may be detachable on said cooling housing and fastened on one or both parts 5A, 5B of the latter by any suitable means. In this case, the handle is made of a light metallic alloy, a good heat conductor.

According to another mode of execution applicable to pole-mounted chain saws, according to which the cutting head is positioned at a distance from the control handle by means of an arm or pole 12, this pole also constitutes an exchanging device participating in the cooling of the motor 4 driving the cutting chain. In this case, the pole 12 and the connection sleeve 11 of the pole are made of a light metallic alloy, a good heat conductor.

Each of the components 5A, 5B of the cooling housing 5, the removable guide bar 3, the handle and, in the case of pole-mounted chains saws, the pole 12, collaborate with the motor 4 and with the electronic control card 6 of said motor, to evacuate the heat generated by the latter items towards the outside.

Figure 3:
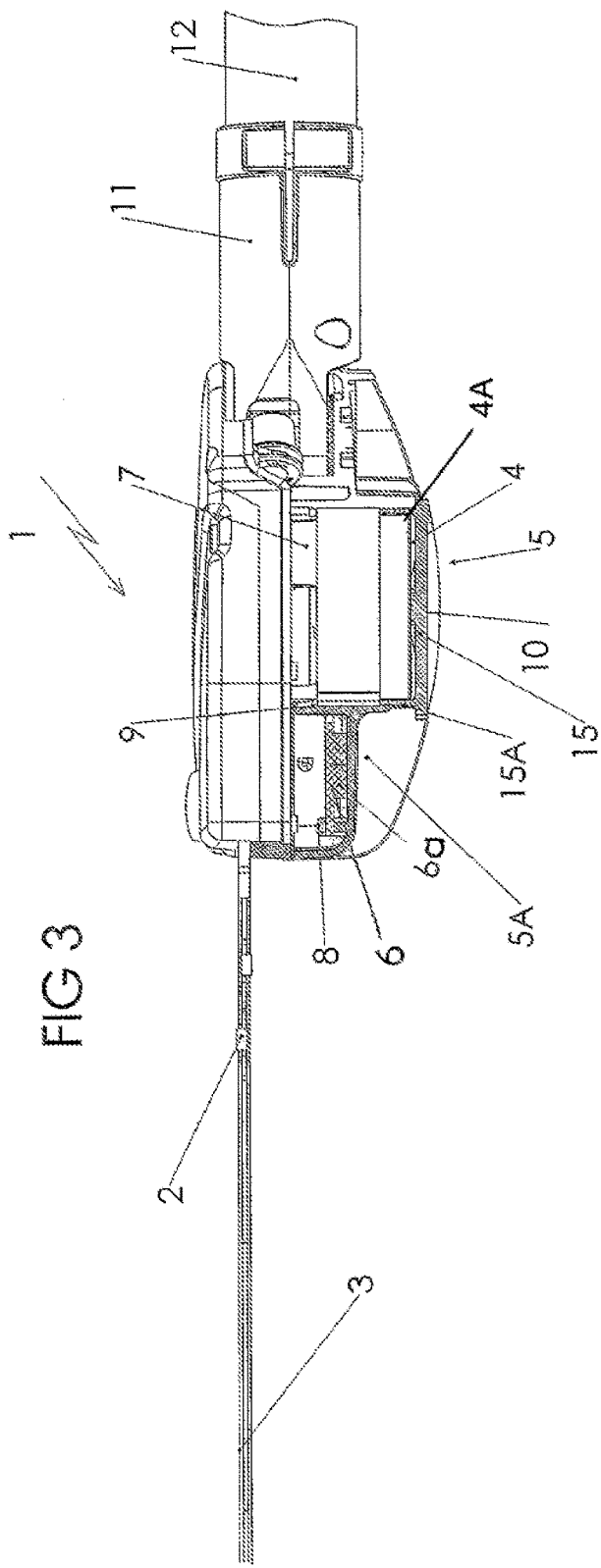
FIG. 3 is a partial perspective and sectional view analogous to FIG. 2, showing a chain saw according to a second mode of production of the invention.

According to the mode of execution illustrated in FIG. 3, the cylinder 13 is open and the component 5A of the housing 5 has an opening which provides access to the seat 7 and which facilitates the installation and removal of the motor 4 in said seat. A metallic cover plate 15 closes this opening and thus forms the bottom of said cylinder 13. This cover plate 15 features a ring-shaped skirt 15A which is forced into the seat 7 and which tightens a part of the motor 4 against the cylinder 13. The cover plate 15 is preferably made of the same heat conducting material of which the other components of the housing 5 are made.

According to the mode of execution shown in FIG. 4, the cooling housing 5 defines only one single seat 16. The cover 15 is screwed into a flange 17 of the housing 5. This flange 17 and the peripheral portion 15b of the cover plate together form the single cooling fin 10 provided for component 5A of the housing 5.

I claim:

1. A method of cooling an electric chain saw, said electric chain saw having a brushless direct current motor that is drivingly connected to a sprocket, the electric chain saw having a guide bar of an oblong shape with a cutting chain fitted thereover, the method comprising:
    forming a housing having a first component and a second component, said housing being formed of a light metallic material;
    placing said motor in said housing such that said motor has a surface in direct contact with at least one surface of said housing;
    actuating said motor so as to cause said sprocket to rotate said cutting chain around said guide bar; and
    statically cooling said motor by heat conductance to the surface of said housing.

2. The method of claim 1, further comprising:
    positioning an electronic control card in said housing such that a commutation component of said electronic control card is in contact with a surface at least one of said first and second components of said housing; and
    cooling said electronic control card by heat conductance to the surface of the at least one of said first and second components.

3. An electric chain saw apparatus comprising:
    a guide bar of an oblong shape;
    a cutting chain fitted around said guide bar;
    a drive sprocket drivingly connected to said cutting chain as to rotate said cutting chain around said guide bar;
    a housing formed of a light metallic alloy, said housing having a first component and a second component;
    a brushless direct current motor enclosed in said housing, said motor drivingly connected to said drive sprocket, said motor being in direct contact with a surface of said housing so as to provide static cooling of said motor, said motor having a stator in direct contact with one of said first and second components of said housing.

4. An electric chain saw apparatus comprising:
    a guide bar of an oblong shape;
    a cutting chain fitted around said guide bar;
    a drive sprocket drivingly connected to said cutting chain as to rotate said cutting chain around said guide bar;
    a housing formed of a light metallic alloy, said housing having a first component and a second component;
    a brushless direct current motor enclosed in said housing, said motor drivingly connected to said drive sprocket, said motor being in direct contact with a surface of said housing so as to provide static cooling of said motor; and
    an electronic control card cooperative with said motor, said electronic control card positioned in said housing such that a surface of said housing is in direct contact with a commutation component of said electronic control card.

5. The electric chain saw apparatus of claim 4, said light metallic alloy being an aluminum alloy.

6. The electric chain saw apparatus of claim 4, said light metallic alloy being a magnesium alloy.

7. The electric chain saw apparatus of claim 4, at least one of said first and second components having at least one cooling fin.

8. The electric chain saw apparatus of claim 4, said first component having a face receiving and supporting said guide bar.

9. The electric chain saw apparatus of claim 4, further comprising:
    a metallic handle attached to said housing.

10. The electric chain saw apparatus of claim 9, said metallic handle being integrally formed with said housing.

11. The electric chain saw apparatus of claim 9, said metallic handle affixed to said first component and said second component of said housing.

12. The electric chain saw apparatus of claim 4, further comprising:
    a pole affixed in heat conductive relationship with said housing.

13. The electric chain saw apparatus of claim 12, said guide bar and said pole being in heat conductive relationship with said housing so as to evacuate heat way from said motor.

14. The electric chain saw apparatus of claim 4, said motor having a seat and said electronic control card having a seat, the seats being separated by a cooling partition.

15. The electric chain saw apparatus of claim 4, said first component being assembled in a leakproof manner to said second components.

* * * * *